Sept. 11, 1928.
A. D. SUMMERS
1,683,932
COMBINED LOCKING DEVICE AND SEAL
Filed Aug. 31, 1927
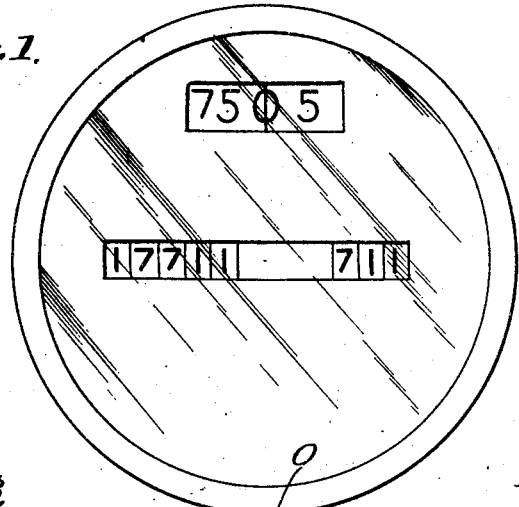
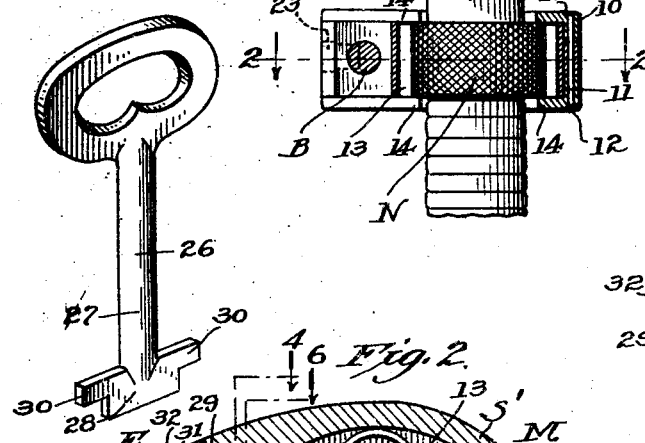
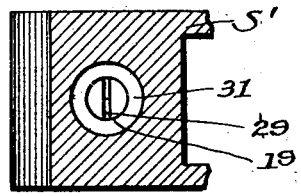
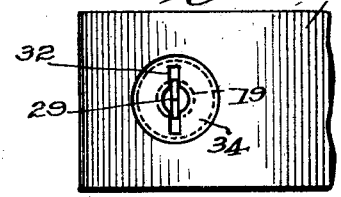
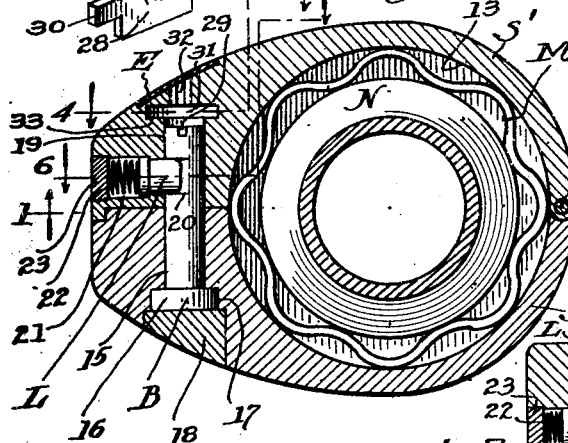
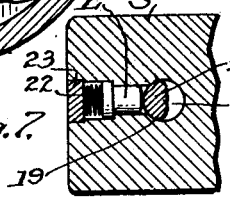
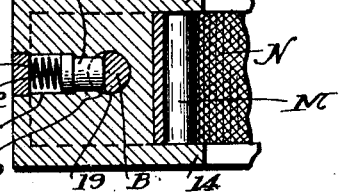
INVENTOR
Arthur D. Summers
By Munn & Co.
ATTORNEY Patented Sept. 11, 1928.

1,683,932

UNITED STATES PATENT OFFICE.

ARTHUR D. SUMMERS, OF LOS ANGELES, CALIFORNIA, ASSIGNOR TO SPEEDOMETER LOCK-SEAL COMPANY, OF LOS ANGELES, CALIFORNIA.

COMBINED LOCKING DEVICE AND SEAL.

Application filed August 31, 1927. Serial No. 216,713.

My invention relates to a combined locking device and seal, particularly adapted, although not necessarily for the speedometers of motor vehicles, and it is a purpose of my invention to provide a device of this character, by which the usual couplings at the ends of the flexible drive shaft housing for connecting the housing to the speedometer head and to a drive element on the vehicle, can be securely locked and sealed against tampering therewith, and in such manner that the couplings cannot be disconnected without first breaking a seal and then using a suitable instrument to unlock the device, to the end that in instances where vehicles are rented for payment of the use thereof on a mileage basis, the rentee will be prevented from tampering with the couplings, and should he do so, the fact will be visibly evidenced by the broken seal to one inspecting the devices upon the return of the vehicle.

I will describe only one form of combined locking device and seal embodying my invention and will then point out the novel features in claims.

In the accompanying drawing:

Fig. 1 is a view showing in vertical section one form of combined locking device and seal embodying my invention, applied to the coupling of a speedometer shaft housing;

Fig. 2 is an enlarged sectional view taken on the line 2—2 of Fig. 1;

Fig. 3 is a perspective view of a key embodied in my device;

Fig. 4 is a fragmentary sectional view taken on the lines 4—4 of Fig. 2;

Fig. 5 is a fragmentary view in elevation illustrating the form of key slot in my device for receiving the head of the key shown in Fig. 3;

Fig. 6 is a fragmentary sectional view taken on the line 6—6 of Fig. 2 and illustrating the locked position of my device, and Fig. 7 is a view similar to Fig. 6 and illustrating the unlocked position of my device.

Referring specifically to the drawing in which similar reference characters designate similar parts in each of the several views, my invention in its present embodiment comprises a pair of complementary metallic sections S and S' which in the present instance are provided with interfitting sleeves 10 through which extends a pin 11 having its ends swaged as indicated at 12 to permanently and hingedly connect the sections together at one end, thereby permitting the sections to be swung outwardly from each other to the open position shown in broken lines in Fig. 2 or inwardly towards each other to the closed position shown in this figure, and in which the free ends of the sections abut each other. In the closed position of the sections they co-operate to define a circular opening 13, and at their opposite sides they are provided with inwardly projecting flanges 14 to form therebetween an annular recess in which a member M in the form of a transversely undulated ring of relatively hard and preferably tempered flat metal is adapted to be received.

The sections are adapted to be locked together in closed position, and to this end a bolt B in the form of a pin is rotatably mounted in an opening 15 formed in the section S, and is provided with a head 16 seating in an enlarged pocket 17 having its outer end permanently closed by a plug 18, so that while the bolt is free to be rotated, longitudinal displacement of the bolt is positively prevented. In the closed position of the sections a portion of the bolt B projects into an opening 19 formed in the section S', which portion is provided at one side with a recess 20 in which a latching element L in the form of a headed pin is adapted to be received when the bolt occupies the position shown in Figs. 2 and 6. The latching element L is freely mounted in a bore 21 formed in the section S', and a coil spring 22 is interposed between the inner headed end of the pin and a plug 23 permanently closing the outer end of the bore so that the spring normally urges the latching element to the projected position shown in Figs. 2 and 6 in which its forward end extends into the bolt receiving opening 19 in latching engagement with the recess 20 of the bolt.

The side edges of the bottom wall 24 of the recess 20 are rounded as shown at 25 and co-operate with the bottom wall to provide a cam surface by means of which the latching element L is adapted to be moved to the retracted position shown in Fig. 7 upon rotation of the bolt to the position shown in this figure, so that the element L no longer latches the bolt, thus permitting the sections to be moved to open position.

The bolt B is adapted to be manually rotated to retract the latching element L, by means of a suitable instrument which in the present instance is in the form of a key 26, the shank 27 of which is flattened at its free end to provide a head 28 adapted to seat in a groove 29 formed in the outer end of the bolt. The shank 27 of the key is further provided with a pair of laterally extending lugs 30, and to provide access to the groove 29 of the bolt, the bolt receiving opening 19 communicates with an enlarged annular pocket 31 which in turn communicates with a slot 32 having the contour of the cross section of the shank 27 and its lugs 30, so that they are adapted to be freely extended through the slot until the lugs 30 seat against the shoulder 33 formed between the pocket 31 and opening 19, in which position the head 28 seats in the groove 29 of the bolt B, so that the bolt can be rotated by the key as desired.

The slot 32 is adapted to be sealed so as to prevent access to the groove 29 of the bolt, by means of a sealing element E in the form of a disk of metal which is adapted to be pressed into a shallow annular pocket 34 in the section S' and thus cover the slot 32, the sealing element being soldered or otherwise fixedly secured in position.

The device as above described is adapted to be applied to one of the usual coupling nuts employed at the ends of the flexible drive shaft housing a motor vehicle speedometer, to couple the housing at one end to the conventional speedometer head and at the other end to a driving element (not shown) on the vehicle and by means of which the speedometer is actuated in accordance with the travel of the vehicle over the road, all of which is conventional and will be understood. In practice, two of my devices are used, one for each of the coupling nuts, but for the purpose of illustration I have deemed it sufficient to illustrate the device applied to the nut N for coupling the housing H to the speedometer head O.

In applying the device the nut N is first unscrewed from the speedometer head O so as to permit the member M to be slipped onto the housing, after which the nut is again screwed to the head to securely couple the housing to the head. The member M is now held by the operator in surrounding relation to the nut N, and with the sections S and S' in open position and the bolt B occupying the position shown in Figure 2, the sections are manipulated to position the nut therebetween, after which the sections are moved to closed position. In the closed position of the sections the member M will be interposed between the sections and nut, and the flanges 14 will overlie the opposite sides of the nut so as to prevent lateral displacement of the sections, while the latching element L has snapped into the recess 20 to lock the sections in closed position in enclosing relation to the nut.

With the sealing element E secured in covering relation to the slot 32, it will be clear that unless the element is destroyed or removed, the bolt B will be sealed against access, and that should the sealing element be tampered with, by an unauthorized person, the fact will be visibly evidenced by the condition of the element to one inspecting the latter. Should an effort be made to unscrew the nut N by constricting and then rotating the sections S and S' with a suitable instrument, the member M will operate to prevent the rotary movement of the sections from being transmitted to the nut as the member offers such a hard, smooth and rounded surface to the inner smooth surface of the sections that it will slip on the latter and thus prevent the nut from being rotated.

Should it become necessary to uncouple the housing H from the speedometer head O to effect repairs or lubricating of the mechanism thereof, the sealing element E is first removed, and the key 26 employed to rotate the bolt and retract the latching element L so that the sections S and S' can be moved to open position and removed from the nut N.

It will be noted that although the sealing element E be destroyed, the unlocking of the bolt B would be a difficult matter unless one possessed a key of the same construction as the key 26, thus precluding the possibility of the device being removed from the nut N.

Although I have herein shown and described only one form of combined locking device and seal embodying my invention, it is to be understood that various changes and modifications may be made therein without departing from the spirit of the invention and the spirit and scope of the appended claims.

I claim.

1. A device of the character described comprising means adapted to be applied to a coupling nut of a speedometer shaft housing and having means by which the first means is adapted to be supported against displacement on the nut in enclosing relation to the latter, means by which the first means is adapted to be locked on the nut, and means adapted to be interposed between the first means and the nut by which constriction and rotation of the first means will be rendered ineffective to rotate the nut, whereby unscrewing of the nut will be positively prevented.

2. A device of the character embodied in claim 1 wherein said last means comprised a metallic ring undulated longitudinally and adapted to surround the nut.

3. A device of the character described comprising a pair of sections relatively movable to either an open position in which they are adapted to be applied to a coupling nut of a speedometer shaft housing, or to a closed position in which they are adapted to enclose the nut, one of said sections having an opening therein, a locking bolt comprising a pin rotatably mounted in the other section and having one end projecting from the latter and adapted to project into said opening when the sections occupy closed position, and means comprising a pin carried by the first said section adapted to coact with said bolt in detachably securing the latter against withdrawal from the first said section, to thereby lock the sections in closed position.

4. A device of the character described comprising a pair of sections relatively movable to either an open position in which they are adapted to be applied to a coupling nut of a speedometer shaft housing, or to a closed position in which they are adapted to enclose the nut, one of said sections having an opening therein, a locking bolt comprising a pin rotatably mounted in the other section and having one end projecting from the latter for projection into said opening when the sections occupy closed position, said bolt having a recess, a latching element comprising a pin slidably mounted in the first said section transversely of the length of the locking bolt and normally urged to a projected position to engage within said recess when the bolt is rotated to one position and thereby latch the bolt against withdrawal from said opening, and means operable upon rotation of said bolt to another position to move said element to a retracted position and thereby permit the withdrawal of the bolt from said opening and the movement of the sections to open position.

5. A device of the character described comprising a pair of sections relatively movable to either an open position in which they are adapted to be applied to a coupling nut of a speedometer shaft housing, or to a closed position in which they are adapted to enclose the nut, one of said sections having an opening therein, a locking bolt comprising a pin rotatably mounted in the other section and projecting into said opening when the sections occupy closed position, said bolt having a recess, a latching element mounted in the first said section and normally urged to a projected position to engage within said recess when the bolt is rotated to one position and thereby latch the bolt against withdrawal from said opening, and cam means on the bolt operable upon rotation of the latter to another position to engage and move said element to a retracted position and thereby permit the withdrawal of the bolt from said opening and the movement of the sections to open position.

6. A device of the character described comprising a pair of hingedly connected sections adapted when opened to permit the application of the sections to a coupling nut of a speedometer shaft housing and when closed to enclose the coupling nut one of said sections having an opening therethrough, a bolt comprising a pin rotatably mounted in the other section, having a transversely extending recess, an end of the pin projecting from said other section for reception into said opening when the sections are closed, said first mentioned section having a second opening therein at an angle to and communicating with the first opening, a latching pin in said second opening, and a spring for urging said latching pin to a projected position in which it is adapted to engage within said recess when the bolt is rotated to one position, to thereby latch the bolt against withdrawal from said opening, one wall of said recess constituting a cam surface operable upon rotation of the bolt to another position to move said latching pin to a retracted position out of engagement with said recess and thereby permit the withdrawal of the bolt and the opening of the sections.

7. A device as embodied in claim 6 wherein the first mentioned section is provided with a recess and a sealing element comprising a disk is secured in said recess in covering relation to the bolt receiving opening so as to seal the bolt against access when locking the sections in closed position.

8. A device as embodied in claim 6 including a metallic ring undulated longitudinally and adapted to be interposed between the sections and to surround the coupling nut for the purpose described.

ARTHUR D. SUMMERS.